UNITED STATES PATENT OFFICE.

KARL DIETERICH, OF HELFENBERG, GERMANY.

AGAR-AGAR-CASCARA PRODUCT AND PROCESS OF MAKING SAME.

No. 896,807.     Specification of Letters Patent.    Patented Aug. 25, 1908.

Application filed October 10, 1906. Serial No. 338,231. (Specimens.)

*To all whom it may concern:*

Be it known that I, KARL DIETERICH, a subject of the King of Saxony and the Emperor of Germany, and a resident of Helfenberg, in the Kingdom of Saxony, Germany, have invented a certain new, useful, and Improved Agar-Agar-Cascara Product and Process of Making Same.

In so entitling my present improvements, it is not to be implied that they are necessarily limited to an agar-agar-cascara product and process. On the contrary their scope is to be determined by the claims as interpreted in the light of the specification and the art.

The utility of the new product is for example its use as a medicine or remedy for constipation.

The process for making the improved product will now be described and after that the nature of the product obtained, and the theory of its action, together with its advantages over other products in which the ingredients are differently combined.

Describing now the process of making the new product, I will give an exact formula for conducting the process with agar-agar and cascara, it being understood that the formula given is in the nature of a preferred formula and process, and accordingly that the invention is not to be deemed limited to the precise features of the process as outlined.

In the first place the agar-agar employed may be the long straw-like form of commerce; this agar-agar, it will be understood is in dry, ungelatinized condition. Starting with 10 kilos of agar-agar straws, they are broken up into fragments and saturated with 1% of glycerin on a preferably non-absorbent surface such as glass. A solution consisting of 2 kilos of aqueous extract of cascara in 18 kilos of water is then prepared. This solution is added to the glycerized agar-agar preferably in three successive portions as follows. The first third of the cascara solution is thoroughly mixed with the glycerized agar-agar and after the cascara has become absorbed into the agar-agar the material is dried in an oven at about 40° C. Next the second third of the cascara solution is mixed with and absorbed into the dry agar-agar material and then dried at 40° C. Finally the last third of the cascara solution is added and after absorption into the agar-agar material the same while still moist is forced through a sieve to give the material a rod-like form after which being finally dried at 40° C. the rods are broken up, milled or granulated into flakes or grains.

As stated the absorption of the cascara into the agar-agar is preferably conducted in stages the advantage being that impregnation is much more thorough than if the entire cascara solution be added in one operation.

The resulting product in the form of dry flakes, kernels or granules, or aggregations of these into tablets and the like, contains the cascara so intimately combined or impregnated through the substance of the agar-agar that in spite of its extreme bitterness the cascara gives no substantial taste when the product is chewed preparatory to swallowing. As a still further result of the intimacy with which the ingredients are combined in the new product, said product taken into the alimentary tract does not yield up its cascara to any substantial extent until it has passed into the large intestine or bowel. This means that the new product delivers substantially its full charge of cascara into the bowel without loss by absorption in the stomach or other parts of the alimentary tract. It therefore localizes the cascara to the place where alone its stimulating quality is effective to produce defecation and thereby saves all prior parts of the alimentary tract from the burden of useless excitation such as takes place when uncombined or ordinary cascara extract is taken as a laxative. Thus the following advantages among others may be now summarized as belonging to the new product due to the intimacy with which the cascara is combined with the agar-agar. First, the product is made practically tasteless; second, the action of the cascara is localized to the large intestine or bowel; third, the organs ahead of the bowel are not burdened by the escape of cascara; and fourth, since none of the cascara is wasted, because substantially all of it is delivered intact to the bowel, cascara can be saved since the dose can be limited to the exact quantity required to cause defecation and no excess supply need be administered to provide for loss by absorption in the other parts of the alimentary tract such as occurs in taking uncombined cascara.

The reason why the cascara in the new product is tasteless and why it is delivered intact to the bowel may be ascribed to the protective action of the agar-agar which the cascara impregnates.

By way of further explanation it may be said that the dry, ungelatinized agar-agar material in its passage through the alimentary tract gradually absorbs more and more liquid and so becomes more and more wet through its substance, and of greater volume as it proceeds. The gelatinizing process however is a slow one and the agar-agar material only becomes wet through and through after it has reached the large intestine. It is here only that the particles of agar-agar material assume their final condition of completely gelatinized, soft, thoroughly wet, slippery masses of largely increased bulk. Becoming wet through and through for the first time in the large intestine, the cascara is there completely delivered by the material to act with its full force to excite the walls of the bowel to peristaltic action.

Not only is the new product such that the agar-agar works in combination with the cascara to protect it from loss in the mouth and so to prevent it from being tasted and further to protect it from substantial loss in the alimentary tract ahead of the bowel, but even after the ingredients have become as explained dissociated in the bowel, they still continue to act in combination, this time to produce defecation. To explain this last statement, it should be prefaced that in habitually constipated persons it is found that the feces in the bowel are as a rule markedly deficient in moisture to the extent of being dry and hard, and are of correspondingly diminished bulk as compared with normal feces. This abnormal condition of the feces is restored to normal by the wet, slippery, swollen particles or masses of gelatinized agar-agar, which there mix with the dry, hard, deficient feces to give them the moist, slippery quality as well as the bulk of normal feces. Moreover the cascara having been liberated as previously explained, now sets up peristaltic action which becomes, due to the presence of the gelatinized masses of agar-agar in the bowel, highly effective to evacuate the contents of the bowel, for without the gelatinized agar-agar in the feces, the peristaltic action induced by the cascara would be acting at a great mechanical disadvantage because in the first place the deficient feces would not fill the cross-section of the bowel and in the second place, being dry and hard, they would present much frictional resistance towards being forced through the bowel. In short the cascara and the agar-agar act in combination to cause defecation; the former by exciting the muscular activity of the bowel, and the latter by giving the feces the normal condition or quality best suited for peristaltic action to work upon.

It may be noted here that the agar-agar ingredient of the product as administered is in a dry or ungelatinous condition. This is essential because agar-agar in the form of a jelly, decoction or soup is absorbed on its way to the large intestine and if employed would defeat the result obtained by the product herein which is to have the material carrying the cascara to be undigestible so that it will arrive in the bowel in a solid condition where giving up its cascara or laxative material, it will function under peristaltic action to push forward the feces.

Thus it will be noted that the product herein comprises an agar-agar ingredient and a cascara ingredient. The agar-agar has the property of slowly gelatinizing in water, saliva, gastric and other digestive fluids at body temperatures without liquefaction and accordingly arrives in the bowel substantially without loss and has a wet, slippery, swollen, solid condition. The cascara ingredient consists of a laxative material. This material is so intimately combined with the agar-agar material and said material is of such a nature that the delivery of the laxative is practically localized to the large intestine.

I do not claim broadly as my invention any and all sorts of mixtures of agar-agar like substances with a laxative, but on the contrary limit my invention to a species of said generic mixtures or products (and to the process of making same) wherein the agar-agar like material has its substance impregnated with the laxative.

Having thus described my invention, what I claim is:

1. A dry product adapted to be taken as an internal remedy, comprising ungelatinized agar-agar having its substance impregnated with cascara.

2. A product adapted to be taken as an internal remedy consisting of dry, granular material made up of ungelatinized agar-agar impregnated with cascara.

3. A dry product adapted to be taken as an internal remedy, comprising ungelatinized agar-agar having its substance impregnated with a laxative.

4. A process comprising in combination, treating ungelatinized agar-agar with glycerin, subjecting the glycerized agar-agar to a solution of a laxative until absorption thereof, and drying.

5. A process comprising in combination, treating ungelatinized agar-agar with glycerin, subjecting the glycerized agar-agar to successive treatments with an aqueous solution of cascara to get absorption thereof, and drying after each cascara treatment.

6. A product adapted to be taken as an internal remedy, comprising ungelatinized agar-agar having its substance impregnated with cascara and glycerin.

7. A process comprising in combination, treating ungelatinized agar-agar with glycerin, subjecting the glycerized agar-agar to a solution of a laxative until absorption thereof, and drying, and granulating.

In witness whereof I have signed my name to this specification in the presence of two subscribing witnesses.

KARL DIETERICH.

In presence of—
PAUL E. SCHILLING,
PAUL ARRAS.